United States Patent [19]

Metabi et al.

[11] Patent Number: 4,483,603
[45] Date of Patent: Nov. 20, 1984

[54] AUTOMATIC FOCUSING ARRANGEMENT FOR CHANGING THE FOCUS DRIVING DIRECTION IN ACCORDANCE WITH THE TYPE OF INTERCHANGEABLE OPTICAL UNIT

[75] Inventors: Tsuneyo Metabi; Yukio Maekawa; Makoto Ando, all of Sakai, Japan

[73] Assignee: Minolta Camera Kabushiki Kaisha, Osaka, Japan

[21] Appl. No.: 439,873

[22] Filed: Nov. 8, 1982

[30] Foreign Application Priority Data

Nov. 11, 1981 [JP] Japan .................. 56-181431

[51] Int. Cl.³ .............................................. G03B 3/10
[52] U.S. Cl. ..................................... 354/402; 354/406; 354/286
[58] Field of Search ................ 354/25 R, 25 N, 195, 354/286, 402, 406

[56] References Cited

U.S. PATENT DOCUMENTS 4,272,174  6/1981  Terramoto et al.
4,304,463 12/1981  Tomori
4,323,303  4/1982  Enomoto ................... 354/286
4,391,488  7/1983  Ishizaka et al. ........... 354/286
4,400,075  8/1983  Tomori et al. ............. 354/286
4,403,843  9/1983  Maitani et al. ............ 354/25
4,413,893 11/1983  Tomori ..................... 354/286
4,413,894 11/1983  Miki et al. ............... 354/286
4,416,526 11/1983  Tomori et al. ............. 354/286

*Primary Examiner*—Russell E. Adams
*Attorney, Agent, or Firm*—Watson, Cole, Grindle & Watson

[57] ABSTRACT

A camera body and an interchangeable lens removably mounted thereon are equipped with an automatic focusing arrangement. The interchangeable lens includes a signal means for generating a relation signal representing the relationship between the driving directions of a driven section and a focus adjusting section. The camera body includes a focus condition detecting circuit for generating a focusing signal indicating the direction for focusing, a driving section for driving the driven section and change-over means for reversing the relationship, between a direction indicated by the focusing signal and a driving direction of the driving section in response to the relation signal from the signal means.

16 Claims, 18 Drawing Figures

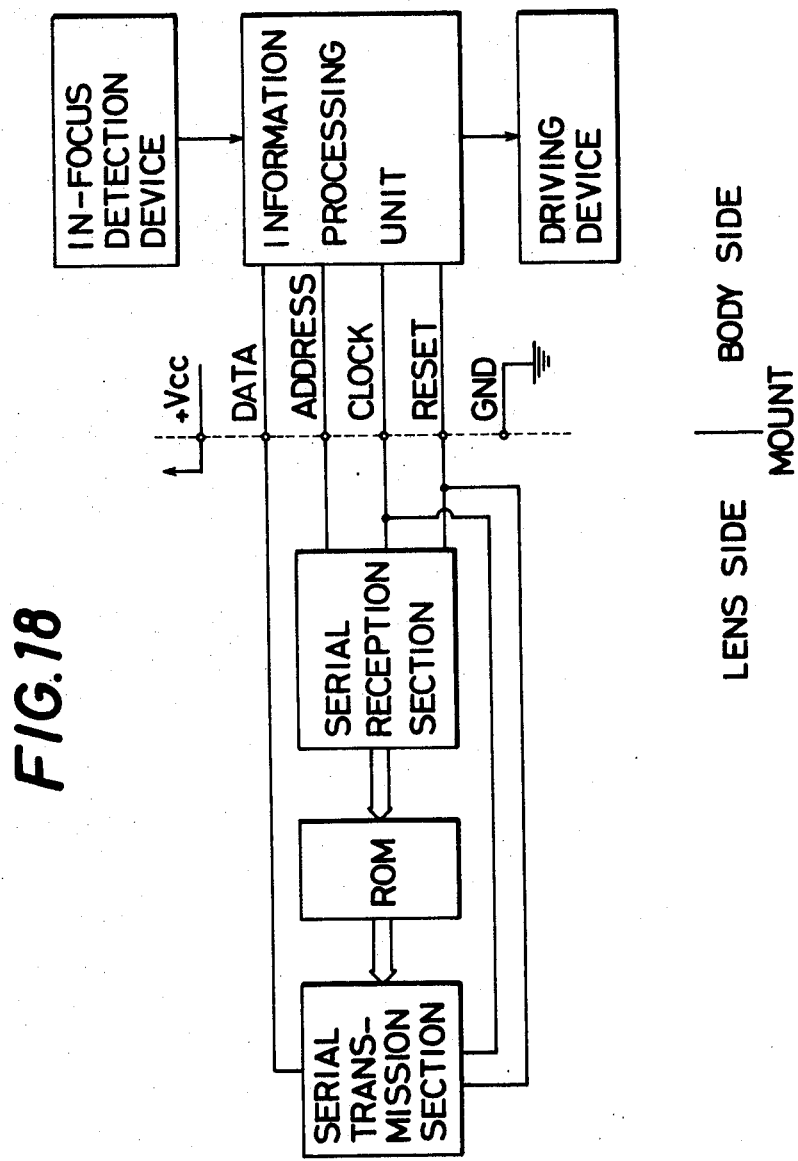

AUTOMATIC FOCUSING ARRANGEMENT FOR CHANGING THE FOCUS DRIVING DIRECTION IN ACCORDANCE WITH THE TYPE OF INTERCHANGEABLE OPTICAL UNIT

BACKGROUND OF THE INVENTION

1. Technical Field

The present invention relates to an automatic focusing arrangement which is adapted to drive a driven section of an interchangeable optical unit by a driving section in the main body of an optical instrument. For example, the optical instrument is a photographic camera with a camera body as the main body on which an interchangeable lens as the optical unit is mounted. In this case, the automatic focusing arrangement effects the automatic focusing through driving of the driven section in the interchangeable lens by the driving section provided in the camera body. The present invention also relates to the interchangeable optical unit and an instrument body coupled therewith which are adapted to automatically focus the optical unit.

2. Description of the Prior Art

For automatic focusing, an arrangement is possible in which a camera body is provided with a light receiving portion, an operation circuit, a motor, a motor driving control section, a driving shaft, etc., the focus condition of the image formed by an optical system of an interchangeable lens is detected by the light receiving portion, and when the detection indicates that an in-focus state has not been reached as yet, a judgement is made by the operation circuit as to the direction in which the optical system should be moved, in order that the operation circuit indicates the direction of movement for the focusing of the optical system.

In the above case, the indication of the direction is, in practice, substituted by the indication of the direction, in which the motor should be rotated, i.e. whether the motor should be rotated in the forward or reverse direction. Through rotation of a driving gear driven by the motor rotating in the indicated direction, a driven gear in the interchangeable lens is rotated for transmission of the rotation from a driven section to a focus adjusting section, and thus, the focusing is automatically effected.

However, interchangeable lenses to be driven by the motor as referred to above, in the arrangement as described above, are classified as various kinds, and for this reason, it is extremely difficult to equalize relationship between the driving directions of the focus adjusting section in the camera body and the driven section in the interchangeable lens to be rotated by the driving section for the automatic focusing, i.e. to unify the directions in which the driven section should be rotated for the focus adjustment of the optical system towards its terminal focusing position (for example, towards infinity focusing position).

More specifically, since the location of the driven section is determined in accordance with the diameters of the interchangeable lenses as designed for the convenience of manufacturing, the rotation given to the driven section is transmitted to an optical system shifting mechanism either through meshing between a pinion and an internal gear or through meshing between a pinion and an external gear, relying on the barrel structure. This difference in the manner of the transmitting the driving force causes the driving section to rotate in opposite directions i.e. in the forward and reverse directions relying on the lens type, for the focusing of the optical system in the same direction.

For eliminating the above inconvenience by normalizing the direction of the rotation of the driving section regardless of the lens type, it is necessary, for example, to limit the kinds of the interchangeable lenses to those having approximately the same range of diameters. If an interchangeable lens, in which the relationship between the driving directions of the focus adjusting section and the driven section is reversed is modified through an increase of the number of gears between the two sections such that the relation becomes normal it becomes bulky in size due to the complex gear mechanisms, with a consequent rise in the manufacturing cost, increase in the failure rate, and reduction of driving force transmission efficiency.

If the direction of a helicoidal screw in the focus adjusting section is reversed between the arrangement which provides the normal relationship of the driving directions of the driven section and the focus adjusting section and the arrangement which does not provide such normal relationship, there is a disadvantage that a lead cam (master cam) or the like of a helicoidal screw processing machine must be increased in number, with the simultaneous necessity for installation of a processing line corresponding to the direction of the screw. Moreover, if such reverse helicoidal screw system is employed for an interchangeable lens provided with both systems for automatic focusing operation and manual focusing operation, the directions of operation for the manual focusing are different according to the lens models, so that the user may be perplexed in determining the proper directions for focusing during actual photographing and may lose the opportunities for shooting by the delay of the focusing operation.

Furthermore, if the orientations of the driving directions for the focus adjusting section in the interchangeable lens are not normalized, it will be impossible to effect focusing for some kinds of camera bodies. It is possible to have a driven section of an interchangeable lens to be driven experimentally before actual automatic focusing so that the direction of the focus driving of a focus adjusting section of the lens by the driven section can be detected and to start the actual automatic focusing with the detected result considered. However, there will result the inconvenience such as an extreme increase of time required for the focusing, etc.

SUMMARY OF THE INVENTION

It is a primary object of the present invention to provide an automatic focusing arrangement capable of using various interchangeable optical units varying from each other in the relationship between the driving directions of its driven section and its focus adjusting section.

In an automatic focusing arrangement of the present invention, a signal means provided in an interchangeable optical unit generates the relationship signal indicating the relationship between the driving directions of a driven section and a focus adjusting section. A main body of an optical instrument includes a focus condition detecting means for detecting the focus condition to generate a focusing signal indicating the direction for focusing, and a change-over means for changing-over the relationship between the direction for focusing indicated by the focusing signal and the driving direction of the driving section in response to the relation signal from the interchangeable lens.

The above arrangement, independently of the relationship between the driving directions of the driven section and the focus adjusting section, enables the focus adjusting section in the interchangeable lens to be driven in a proper direction to bring the optical system to an infocus position in accordance with the focusing signal, without unification of the directional relationships.

Accordingly the disadvantages resulting from such unification may be avoided. Moreover, since it is unnecessary to experimentally drive the driven section of the interchangeable lens for the detection of the relationship between the driving directions of the driven section and the focus adjusting section, the difficulties caused thereby and the time required therefor are eliminated.

Furthermore, the interchangeable optical unit has only to be provided with signal means, without particularly a rise in cost to a large extent, while the optical instrument main body may be provided only with the means for changing over the driving direction, with respect to the driven section by the driving section, between the forward and reverse directions according to the signals of the signal means at the side of the interchangeable optical unit, and thus, the arrangement of the present invention may be readily provided at low cost.

The above and other objects and features of the present invention will become more apparent from the following description of preferred embodiments of the present invention taken in conjunction with the accompanying drawings.

BRIEF DESCRIPTION OF THE DRAWINGS

The accompanying drawings respectively show embodiments of the arrangements according to the present invention, in which;

FIG. 18 is a block diagram of one embodiment in which a read only memory (ROM) is employed a signal means.

DESCRIPTION OF THE PREFERRED EMBODIMENTS

Figure 1:
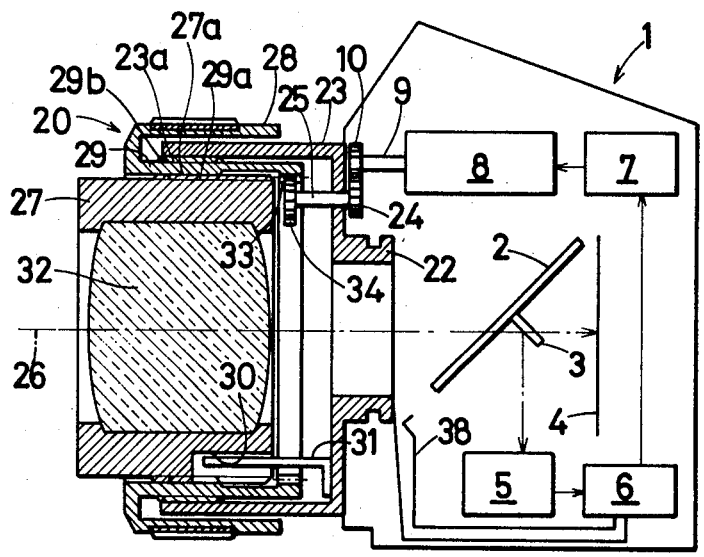
FIGS. 1 and 2 are side sectional views of a camera body and interchangeable lenses according to one preferred embodiment of the present invention, wherein the interchangeable lens differ from one another with respect to the relationship between the driving directions of the driven section and a focus adjusting section, respectively.
Figure 2:
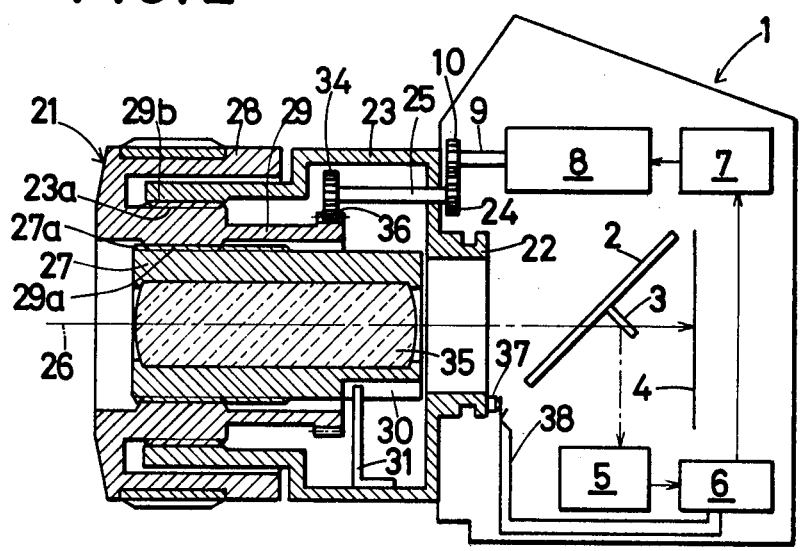

With reference to FIGS. 1 and 2, a camera body 1 of a single reflex camera includes a main mirror 2, an auxiliary mirror 3 and a photographic film 4. The camera body 1 further includes a focus condition detecting means and a driving section. The focus condition detecting means includes a light receiving portion 5 which receives light reflected from a subject to be photographed through the auxiliary mirror 3 for the automatic focusing, and an operation or calculation circuit 6 for making a judgement of the focus condition based on a signal from the light receiving portion 5, thereby generating a focusing signal representing the direction in which focus adjustment should be made, if the infocus state has not been established. The driving section includes a motor driving control circuit 7 which drives a motor 8 in a forward direction or in a reverse direction, or stops motor 8 in accordance with the focusing signals from the calculation circuit 6 as the result of the judgements of the focus condition. The driving section further includes a driving shaft 9 connected to the motor 8 and a driving gaer 10 mounted on driving shaft 9.

With respect to the camera body 1, an interchangeable lens 20 of a large diameter is mounted in FIG. 1, while in the arrangement of FIG. 2, an interchangeable lens 21 of a small diameter is attached. In the interchangeable lenses 20 and 21, mounting portions 22 for detachably mounting lenses 20 and 21 on the camera body 1 are provided integrally with fixed cylinders 23.

In each of FIGS. 1 and 2, interchangeable lenses 20 and 21 have respectively, a driven section including a driven gear 24, a driven shaft 25 and a transmission gear 34, and a focus adjusting means including a fixed cylinder 23, a helicoidal cylinder 29, an inner cylinder 27 and optical system 32 or 35. In a position around the outer periphery of the mounting portion 22, there is provided the driven shaft 25 having the driven gaer 24 which is brought into engagement with, or disengaged from, the driving gear 10 described earlier, upon attaching or detaching of the lens 20 or 21 to the camera body 1. The driving shaft 9 and the driven shaft 25 are arranged in parallel with an optical axis 26.

The inner cylinder 27 for holding the lens has a helicoidal male thread 27a engaged with a helicoidal female thread 29a of the helicoidal cylinder 29 which is integral with a manual focusing operation ring 28, while a helicoidal male thread 29b of the helicoidal cylinder 29 engages a helicoidal female thread 23a of the fixed cylinder 23.

At a portion in the outer periphery of the inner cylinder 27, a keyway 30 is formed in the direction of the optical axis for engagement with a key 31 secured to a portion of an inner periphery of the fixed cylinder 23 so as to prevent the inner cylinder 27 from rotating about the optical axis 26 and to allow the inner cylinder 27 to move straight in the direction of the optical axis 26.

By the above arrangement, when the helicoidal cylinder 29 is rotated either by the manual focusing operation ring 28 or through transmission from the driven shaft 25, the inner cylinder 27 advances or retreats in the direction of the optical axis to effect the focus adjustment. In the embodiment of FIGS. 1 and 2, the helicoidal threads 27a and 29a are left-handed screws, while the helicoidal screws 23a and 29b are arranged to be right-handed, and thus, upon rotation of the helicoidal cylinder 29 in the clockwise direction as observed from its rear side (i.e. from the right side in the drawings), the inner cylinder 27 is shifted leftwards in FIGS. 1 and 2.

Since the interchangeable lens 20 shown in FIG. 1 holds an optical system 32 with a large diameter in the inner cylinder 27, the helicoidal cylinder 29 also has a large diameter together with the inner cylinder 27, and it is so arranged that the transmission gear 34 on the driven shaft 25 meshes with an internal gear 33 formed at a rear end portion of a helicoidal cylinder 29 for transmission from the driven shaft 25 so as to effectively utilizes a space within the lens barrel. On the other hand, the interchangeable lens 21 as illustrated in FIG. 2 holds an optical system 35 with a small diameter in the inner cylinder 27, and therefore, the helicoidal cylinder 29 also has a small diameter together with an inner cylinder 27. Accordingly, the arrangement is so made that the transmission gear 34 on the driven shaft 25 is engaged with an external gear 36 formed at a rear end portion of the helicoidal cylinder 29 for transmission from the driven shaft 25 so as to utilize a space at the outer periphery of the helicoidal cylinder 29.

Due to the difference in the component orientation of the transmission mechanism from the driven shaft 25 to the helicoidal cylinder 29 as described above, the inner cylinder 29 of the interchangeable lens 21 of FIG. 1 and the inner cylinder 29 of the interchangeable lens 22 of FIG. 2 are driven in opposite directions with respect to each other, even when subjected to rotation in the same direction from the driven shaft 25. Accordingly the orientation of the driving direction of the inner cylinder 27 with respect to the rotational direction of the driven shaft for the automatic focusing should be such that, when one is in the normal relationship, the other is in the reverse relationship. In the case of the reverse relationship, even when the driving shaft 9 is driven in the direction determined by the calculation circuit 6 at the side of the camera body 1, the lens system is shifted in the direction opposite to the direction for focusing, and thus, it becomes impossible to achieve proper focusing.

For normalization of the relationships of the driving directions as described above, other gears may be added between the transmission gear 34 and the external gear 36. As far as observed from the embodiments of FIGS. 1 and 2, it seems that there may be no space related problems and to increased an increase in the size of the products resulting therefrom, but the actual situation is not as it may appear. More specifically, in actual practice, within the lens barrels of the interchangeable lens, there are incorporated more parts from the reasons related to design, processing assembly, etc., and moreover, there are provided an automatic aperture control device, and various signal means and the like besides the automatic focusing arrangement. Furthermore, the compact size of the products has been greatly required in recent years, and the shortening of interchangeable lenses makes their inner spaces small.

Accordingly, it is so arranged that the signal means which generates the relation signal in accordance with the relation between the driving directions of the driven shaft 25 and the inner cylinder 27 are provided in interchangeable lenses 20 and 21, and the driving direction of the driving shaft 9 is automatically changed; over between the forward and reverse directions according to the relation signal upon mounting of the lens 20 and 21 onto the camera body 1. Accordingly, the automatic focusing is properly effected in either of the cases where the relation between the driving directions of the driven shaft and the inner cylinder is normal or reversed.

As a matter of actual practice, it is desirable that a general model whose production quantity is the largest, is to be in the normal relation. In such a general model as described above, it is advantageous not to provide a special signal member and to consider that as a kind of signal means for equalization, from the viewpoints of cost, durability, etc. In the present embodiments, in the interchangeable lens 21 as illustrated in FIG. 2, a signal pin 37 extending rearwardly from the rear end face of mounting 22 is provided as a relation signal which indicates that the relation between driving directions of the internal cylinder (included by the focus adjusting means) and the driven shaft (included by the driven section) is opposite to the normal relation. Whereas, in the interchangeable lens of FIG. 1 which is of the general model, the signal means does not include such a signal pin, but the relation signal indicates the normal relation. Meanwhile, in the camera body 1, there is provided a signal detection switch 38 as a means for detecting the relation signals of the interchangeable lenses 20 and 21 mounted on the camera body 1, so as to be turned "off" when the interchangeable lens 20 without a signal pin is mounted (FIG. 1) and to be turned "on" when the interchangeable lens 21 having the signal pin 37 is attached. (FIG. 2)

The on/off signals of the signal detection switch 38 are applied to the calculation circuit 6, which impresses a driving direction signal corresponding to the normal calculation result to the motor driving control circuit 7, if the switch 38 is in the OFF state and which impresses a driving direction signal corresponding to the reversed calculation result to the motor driving control circuit 7 if switch 38 is ON.

The helicoidal threads 23a and 29b referred to earlier are arranged to stabilize the focusing operation through reduction of the amount of displacement of the helicoidal cylinder 29 in the direction of the optical axis 26 caused by the small amount of rotation of the internal gear 33 and external gear 36 during the focusing operation.

In FIG. 1, upon closing of a main switch (not shown), the light receiving portion 5 detects the focus condition of the image formed by the optical system 32 through the auxiliary mirror 3 so as to apply the information of the detected focus condition to the calculation circuit 6. Since the signal detection switch 38 is in the OFF state, the calculation circuit 6 applies to the motor driving control circuit 7, the driving direction signal corresponding to the normal calculation result based on the information from the light receiving portion 5, so as to rotate the motor 8 in the forward or reverse direction. On the assumption that the subject to be photographed is located in a closer position, i.e. when a position behind the subject is in focus, the driving direction signal is produced by calculation circuit 7 to rotate the motor 8 in the forward direction, and the driving shaft 9 is rotated in the counterclockwise direction as observed from the rear side (i.e. from the right side in FIG. 1), whereby the driven shaft 25 is rotated in the clockwise direction through the gears 10 and 24, and causes the helicoidal cylinder 29 to rotate clockwise through the transmission gear 34 and internal gear 33. Accordingly, the internal cylinder 27 and the optical system 32 are shifted leftwards in FIG. 1 through the right-handed helicoidal threads 27a and 29a and the left-handed helicoidal threads 23a and 29b.

According to the movement of the taking lens 32 as described above, the focus condition detected by the light receiving portion 5 comes into the state of being in-focus, and upon arrival at the in-focus state, the calculation circuit 6 applies a motor stopping signal to the motor driving control circuit 7, and thus, the motor 8 is stopped. In actual practice, however, there is a certain time lag from the detection of the in-focus state until the stopping of the optical system 32, and various countermeasures are normally taken therefor, but illustrations and description thereof are abbreviated here for brevity.

Meanwhile, in FIG. 2, since the signal detection switch 38 is in the "on" state, the calculation circuit 6 applies to the motor driving control circuit 7, the driving direction signal corresponding to the reversed calculation result. Now, on the supposition that the subject to be photographed is in the closer state in the similar manner as in the case of FIG. 1, the driving direction signal is produced by the calculation circuit 7 to rotate the motor 8 in the reverse direction contrary to the above case, and the driving shaft 9 is rotated in the clockwise direction which is opposite to the above, as viewed from the rear side (i.e. from the right side in FIG. 1), while the driven shaft 25 is also rotated in the counterclockwise direction which is opposite to that in the above case. The counterclockwise rotation of the driven shaft 25, however, is transmitted in the clockwise direction with respect to the helicoidal cylinder 29 through the transmission gear 34 and the external gear 36. Accordingly, the helicoidal cylinder 29 is rotated in the clockwise direction in a similar manner as in the case of FIG. 1, and therefore, the taking lens 35 is shifted leftwards in the drawing by the helicoidal threads 27a, 29a, 23a and 29b.

Thus, in this case also, the focus condition detected by the light receiving portion 5 varies towards the in-focus state, by the movement of the optical system 35 as described earlier, and upon arrival at the in-focus state, the motor 8 is stopped by the motor stopping signal from the calculation circuit 6.

As described so far, by the arrangement of the present invention in which, even when either one of the two kinds of interchangeable lenses having opposite relations between the driving directions of the driven section and focusing adjusting means is attached to the camera body, the proper driving direction of the driving shaft at the camera body is automatically determined in accordance with the relation described above in the attached interchangeable lens, and thus, the troublesome procedure required for once actuating the driving shaft at the camera body to detect the relation between the driving directions of the interchangeable lens every time the interchangeable lens is attached to the camera body, and the time required for the preparation therefor, have been made unnecessary, and thus, it has become possible to effect photographing by the automatic focusing simultaneously upon attaching of the interchangeable lens.

The presence or absence of the signal pin 37 to provide a signal indicative of the relation between the driving directions in the interchangeable lenses 20 and 21 serves as a mechanical signal based the dimensional and/or positional relation with respect to the side of the camera body 1 when the interchangeable lens 20 or 21 is mounted on the camera body 1. By the adoption of the signal pin as described above, there are such advantages that, in addition to the positive application of the signal to the side of the camera body 1, it is sufficient to impart the dimensional and/or positional variations only to one of the two kinds of interchangeable lenses having opposite relations between the driving directions. Moreover, the modes of such signals and specific constructions of the detecting means at the side of the camera body 1 may be modified in various ways.

The respective interchangeable lenses 20 and 21 may of course be operated manually for the focusing by manipulation of the manual focusing operation ring 28, and the manual focusing operation may be effected with the main switch (not shown) opened. Since the ring 28 is simultaneously rotated together with the helicoidal cylinder 29 as one unit for both of the interchangeable lenses 20 and 21, the direction of the manipulation of the ring 28 for focusing does not vary with the interchangeable lens 20 and 21. Accordingly, in the actual photographing, the photographer is free from any perplexity in employing either of the interchangeable lens 20 or 21.

Figure 3:
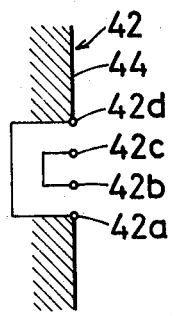
FIGS. 3 and 4 are respectively fragmentary cross sections of essential portions of interchangeable lenses according to another embodiment of the present invention.
Figure 5:
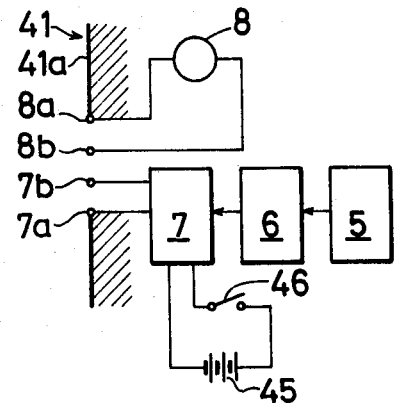
FIG. 5 is a fragmentary cross section of an essential portion of a camera body for the interchangeable lenses of FIGS. 3 and 4.
Figure 4:
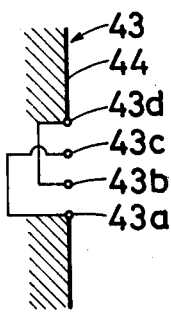
Figure 7:
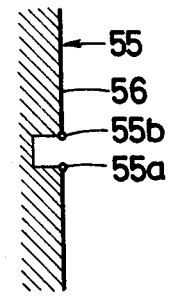
FIGS. 6 and 7 are respectively fragmentary cross sections of interchangeable lenses according to a further embodiment of the present invention.
Figure 6:
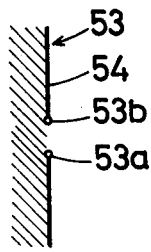

In the embodiment as shown in FIGS. 3 to 5, the camera body 41 has respective connecting terminals 7a, 7b, 8a and 8b between the motor driving control circuit 7 and the motor 8, disposed on a lens mount surface 41a as illustrated in FIG. 5. The interchangeable lens 42 (FIG. 3) having normal relation between driving directions of a driven section and a focus adjusting means and the interchangeable lens 43 (FIG. 4) having the opposite relation are also provided, on their respective mount surfaces 44, with signal terminals 42a, 42b, 42c and 42d (FIG. 3) and signal terminals 43a, 43b, 43c and 43d (FIG. 4) which are respectively connected to the terminals 7a, 7b, 8a and 8b of the camera body 41 upon mounting of the lens 42 and 43 to the camera body.

Among the terminals 42a . . . 42d for the interchangeable lens 42, the terminals 42a and 42d, and also 42b and 42c are respectively connected to each other, and by the mounting of the interchangeable lens 42 onto the camera body 41, the terminals 7a and 8a, and 7b and 8b at the side of the camera body 41 are connected so that the motor 8 is driven in the direction in accordance with the normal calculation result in the calculation circuit 6. However, among the terminals 43a . . . 43d of the interchangeable lens 43, the terminals 43a and 43c, and 43b and 43d are connected to each other, and upon attaching of the interchangeable lens 43 to the camera body 41, the terminals 7a and 8b, and 7b and 8a at the side of the camera body 41 are connected so that the motor 8 is driven in the direction opposite to the result of the calculation in the calculation circuit 6.

In the above arrangement, the terminal group 42a . . . 42d, and the terminal group 43a . . . 43d of the respective interchangeable lenses 42 and 43 are interposed between the motor 8 and the motor driving control circuit 7 so as to form an electrical signal means directly acting to allow the driving direction of the motor 8 to be changed over between the forward and reverse directions in correspondence to the relation between the driving directions of the driven section and the focus adjusting section in the respective interchangeable lenses 42 and 43, and thus, no functioning of members such as turning ON or OFF of the switch, etc. is involved. Accordingly problems at the signal applying and receiving portion between the interchangeable lens and the camera body are made still more difficult to take place. In the drawings, the numeral 45 represents a power source, while the numeral 46 denotes a main switch.

In the embodiment as shown in FIG. 6 through FIG. 9, the terminal construction at the signal applying and receiving portion is reduced by one half as compared with that in the embodiment in FIGS. 3 through 5. More specifically, in the camera body 51, a motor rotating direction inversion circuit 52 is inserted (FIG. 8) between the motor driving control circuit 7 and the motor 8, and circuit 52 is arranged to automatically change over the driving direction of the motor 8 between the forward and reverse directions depending on whether or not a pair of terminals 52a and 52b thereof disposed on the camera body lens mount surface 51a are short-circuited.

The interchangeable lens 53, whose relation between the driving directions of a drive section and a focus adjusting means is normal has, on its mounting portion 54, a pair of terminals 53a and 53b insulated from each other (FIG. 6) and disposed to confront the terminals 52a and 52b of the camera body lens mounting surface 51a referred to earlier. Upon mounting of the interchangeable lens 53 onto the camera body 51, the terminal 53a is connected to the terminal 52a, and the terminal 53b is connected to the terminal 52b respectively, with the terminals 52a and 52b being held in an insulated state. Therefore, at the interchangeable lens 53, a similar result may be obtained even when the entire surface of the mount position 54 and/or the region thereof contacting the camera body side terminals 52a and 52b are made into a mere insulating surface instead of the terminals 53a and 53b, or a portion of the metallic mount portion 53a confronting the terminals 52a and 52b is formed into a recess so as not to contact terminals 52a and 52b.

However, the interchangeable lens 55 whose relation between the driving directions of a driven section and focus adjusting means is opposite, has on its mounting portion 56, a pair of terminals 55a and 55b connected to each other (FIG. 7) and confronting the terminals 52a and 52b at the side of the camera body 51. Upon mounting of the interchangeable lens 55 on the body 51, the terminal 55a is connected to the terminal 52a, and the terminal 55b is connected to the terminal 52b respectively so as to short-circuit the terminals 52a and 52b. Therefore, a similar result may be obtained even when the entire surface of the interchangeable lens mount portion 56 and/or a portion thereof confronting the body side terminals 52a and 52b are made electrically conductive, and thus, the terminals 55a and 55b may be dispensed with. In the case where the entire surface is made conductive, it is desirable to pay attention to the presence of noises.

Figure 8:
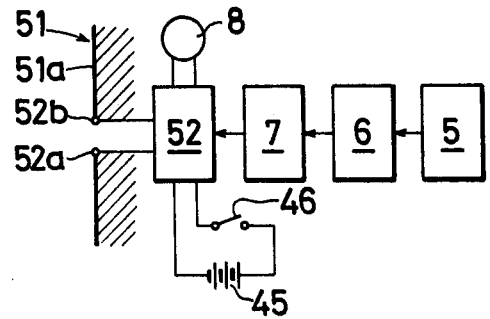
FIG. 8 is a fragmentary cross section of an essential portion of a camera body for the interchangeable lens of FIGS. 6 and 7.
Figure 9:
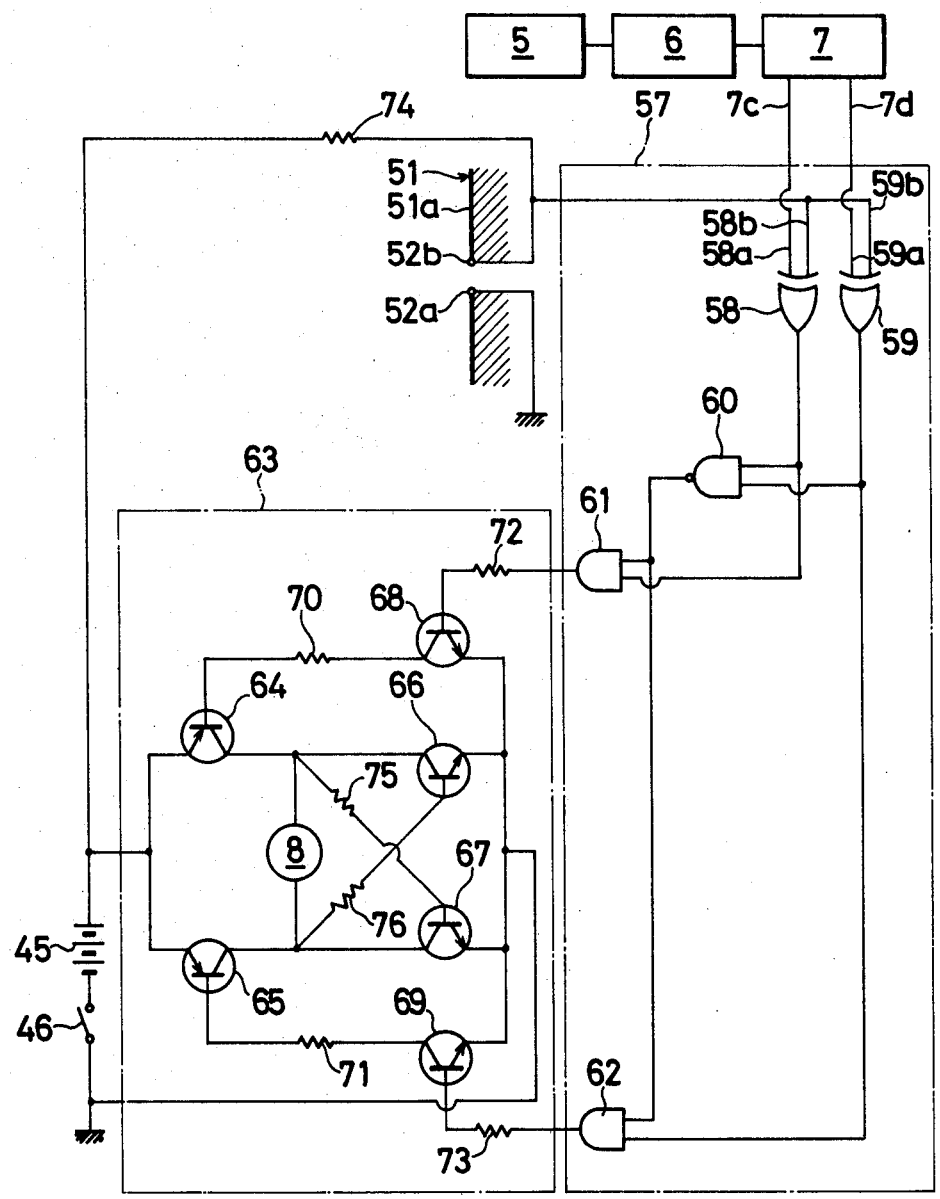
FIG. 9 is an electrical circuit diagram showing one example of a motor rotating direction change-over circuit for the camera body of FIG. 8.

In FIG. 9, there is shown one example of the motor rotational direction reversing circuit 52 of FIG. 8.

In FIG. 9, a signal control circuit 57 is connected to the terminals 52a and 52b so as to respond to the signals represented at the terminals 53a and 53b or 55a and 55b of the interchangeable lens 53 or 55.

The signal control circuit 57 includes exclusive OR circuits 58 and 59, a NAND circuit 60, and AND circuits 61 and 62. A motor driving circuit 63 drives the motor 8 selectively in the forward and reverse directions in accordance with the output signals from the signal control circuit 57. The circuit 63 is constituted by motor driving direction reversing transistors 64, 65, 66 and 67, transistors 68 and 69 for controlling the transistors 64 and 65, and resistors 70, 71, 72 and 73, and is so arranged that the output of the AND circuit 61 is applied to the base of the transistor 68, and that the output of the AND circuit 62 is impressed on the base of the transistor 69 respectively. Resistors 74, 75 and 76 for adjustments are also provided.

Now, when the interchangeable lens 53 is mounted on the camera body 51, the terminals 52a and 52b of the camera body 1 are insulated, so that input signals to the input terminals 58b and 59b of the exclusive OR circuits 58 and 59 are a logic "1", with the main switch 46 closed. When the subject to be photographed is located at a closer distance, i.e. the optical system is focused on the rear point of the subject, a logic "1" is produced from one output terminal 7c of the motor driving control circuit 7, and a logic "0" is output from the other output terminal 7d thereof so as to be respectively applied to the input terminals 58a and 59a of the exclusive OR circuits 58 and 59, whereby outputs from the respective AND circuits 61 and 62 in the signal control circuits 57 are respectively "0" and "1". Accordingly, the transistors 69 and 65 are turned on, with the transistors 68 and 64 being turned off, and the current from the power source 45 flows from the transistors 65 to the motor 8 and the transistor 66, whereby the motor 8 is rotated in the forward direction to advance the optical system.

On the other hand, when the subject to be photographed is located at a greater distance, i.e. when the optical system is focused on a point closer than the subject, the signals applied to the input terminals 58a and 59a of the respective exclusive OR circuits 58 and 59 from the output terminals 7c and 7d of the motor driving control circuit 7 described earlier are logic "0" and "1" contrary to the above case, while outputs from the AND circuits 61 and 62 are respectively "1" and "0". Accordingly, the transistors 68 and 64 are turned on, and the transistors 69 and 65 are turned off, and the current from the power source 45 are caused to flow through the transistor 64, motor 8, and transistor 67, and thus, the motor 8 is rotated in the reverse direction to retreat the optical system.

Upon attainment of an in-focus state, signals of respectively "0", "0" or "1", "1" are to be produced from the output terminals 7c and 7d of the motor driving control circuit 7, and outputs from the respective AND circuits 61 and 62 are "0" and "0". Accordingly, the transistors 68 and 64, and 69 and 65 are simultaneously turned off, and thus, the motor 8 is deenergized to be stopped.

Subsequently, when the interchangeable lens 55 is mounted on the camera body 51, the terminals 52a and 52b on the body 51 are short-circuited by the contact with the terminals 55a and 55b on the lens 55, whereby, to the input terminals 58b and 59b of the respective exclusive OR circuits 58 and 59, the input signal "0" is applied, simultaneously with closure of the main switch 46, contrary to the case of the interchangeable lens 53. Accordingly, the motor 8 is automatically reversed in its driving direction, and thus, the proper automatic focusing is effected, even with respect to the interchangeable lens 55 of the opposite relation between the driving directions of the driven section and focus adjusting section. It should be noted here that the circuit in FIG. 9 may readily be associated with the first embodiment of FIGS. 1 and 2.

Figure 10:
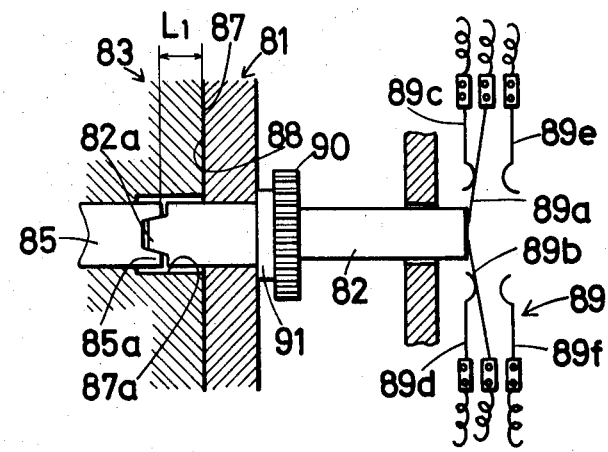
FIGS. 10 and 11 are respectively fragmentary cross sections of interchangeable lenses according to still another embodiment of the present invention.
Figure 11:
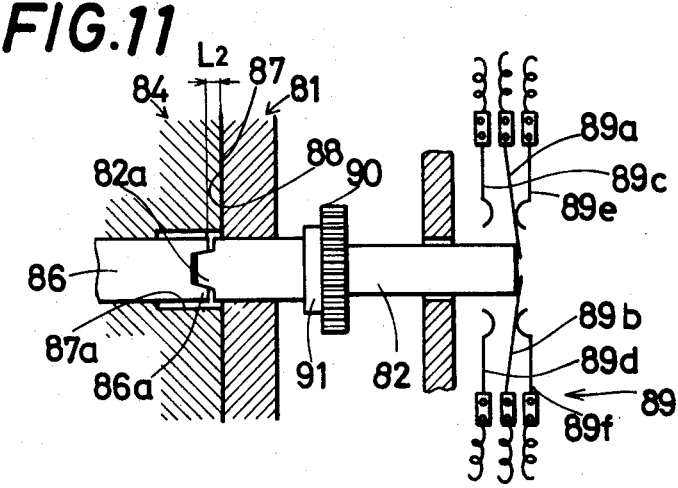
Figure 12:
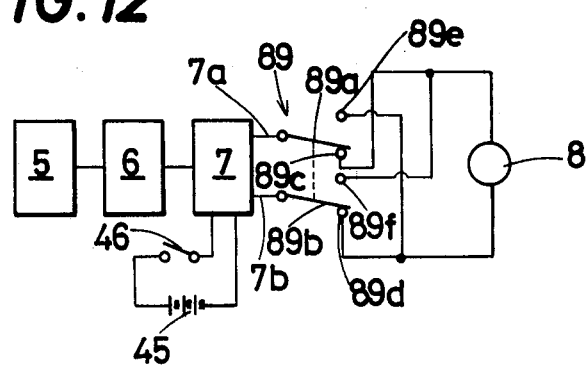
FIG. 12 is an electrical circuit diagram of a circuit provided in a camera body for the interchangeable lens of FIGS. 10 and 11.
Figure 13:
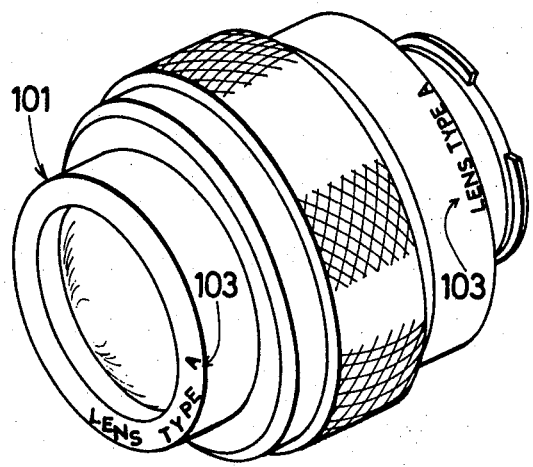
FIGS. 13 and 14 are an overall perspective view and a fragmentary perspective view, respectively of interchangeable lenses according to a further embodiment of the present invention.
Figure 14:
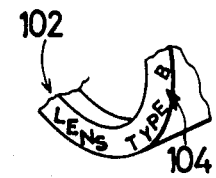

In FIGS. 10 through 12, there is shown an embodiment of a photographic camera of the type arranged such that a driving shaft 82 of the camera body 81 is brought into abuting engagement on the same axis with a driven shaft 85 of an interchangeable lens 83 having a normal relation between driving directions of a driven section and a focus adjusting section, and also with a driven shaft 86 of an interchangeable lens 84 whose relation between driving directions of the driver section and the focus adjusting section is opposite so as to effect transmission of the driving force through a claw or jaw clutch formed at the shaft ends.

The driven shaft 85 of the interchangeable lens 83 whose relation of the driving directions is normal, and the driven shaft 86 of the interchangeable lens 84 whose relation of the driving directions is opposite are arranged to be different in distances $L_1$ and $L_2$ for retreating from the mounting portions 87 of the respective interchangeable lenses 83 and 84 at the respective jaw clutch portions 85a and 86d of the rear ends thereof. (In the embodiment, the relation is $L_1 > L_2$). Meanwhile, the driving shaft 82 provided in the camera body 81 is urged leftwards in the drawings so that the jaw clutch portion 82a at the forward end thereof projects outwardly from the lens mounting surface 88 through resiliency of movable contact pieces 89a and 89b (spring members for this purpose may be provided separately). By the above arrangement, during mounting of the interchangeable lens 83 or 84 onto the camera body 81, the clutch portion 82a is depressed by the mount portion 87 against the spring until completion of the mounting, but upon completion of the mounting, the clutch portion 82a confronts a recessed portion 87a formed at a part of the mounting portion 87 where the clutch portion 85a or 86a at the driven shaft rear end is located, so as to be released from the depression by the mounting portion 87, whereby the clutch portion 82a is engaged with the clutch portion 85a or 86a at the rear end of the driven shaft by the urging of the movable contact pieces 89a and 89b as described earlier.

Therefore, the driving shaft 82 has different amounts of protrusion thereof from the mounting surface 88 as shown in FIGS. 10 and 11, depending on which of the clutch portions 85a and 86a at the rear end of the driven shaft is engaged with the clutch portion 82a of the driving shaft 82. In other words, the positions of the driving shaft 82 in the axial direction are different from each other depending on which of the interchangeable lenses 83 or 84 is mounted on the camera body 81. Accordingly, the arrangement is so made that a switch 89 to be changed over by the difference in positions of the driving shaft 82 in the axial direction is provided so as to be inserted between the motor driving control circuit 7 and motor 8 as shown in FIG. 12, whereby the forward and reverse directions of the driving direction of the motor 8 can be automatically reversed according to the relation between the driving directions of the driven section and the focus adjusting section in the interchangeable lens 83 or 84 to be mounted on the camera body 81. The driving shaft 82 is provided with gear 90 driven by motor 8 and a flange 91 restricting the maximum projecting position of the driving shaft 82 by abutment with the camera body 81.

In a similar manner as in the first embodiment, this embodiment is arranged to impart the differences in the relations of the driving directions in the interchangeable lenses to the camera body by the mechanical signal based on the dimensions of a part at the side of the interchangeable lens. Since the mechanical signal as described above is obtained through the position of the clutch portion at the rear end of the existing driven shaft, no particular mechanical signal member such as the signal pin in the first embodiment is required to be provided, and thus, this embodiment is more advantageous in this respect.

Since the transmission between the driving shaft 82 and the driven shaft 85 or 86 is effected through engagement of the clutch, the direction of the forward rotation of the driving shaft 82 is to be in the clockwise direction as observed from the rear of said shaft 82 (i.e. from the right side in the drawing). The switch 89 includes associated movable pieces 89a and 89b connected to the respective output terminals 7a and 7b of the motor driving control circuit 7, fixed contact pieces 89c and 89d for the forward and reverse normal side of the motor 8, and fixed contact pieces 89e and 89f for the forward and reverse opposite side of motor 8.

Upon completion of the mounting of the interchangeable lens 83 whose relation of the driving directions is normal, the movable contact pieces 89a and 89b are brought into contact with the normal side fixed contact pieces 89c and 89d as shown in FIGS. 10 and 12 so as to cause the driving direction of the motor 8 to follow the instructions of the calculation circuit 6. However, upon completion of the mounting of the interchangeable lens 83 whose relation of the driving directions is opposite, the movable contact pieces 89a and 89b are brought into contact with the reversing side fixed contact pieces 89e and 89f as shown in FIG. 11 for changing over the driving direction of the motor 8 to the opposite direction between the forward and reverse directions.

In the description of the embodiments given above, for better understanding of the present invention, explanation has been given only about the relation signals representing whether the relation between the driving directions of the driven section and the focus adjusting means of the interchangeable lens is normal or opposite, and reversing of the motor driving direction between the forward and reverse directions thereby. In the actual products, however, interchangeable lenses of the kind not having the driven shafts are also used. Therefore, in addition to the identification of the relation of the driving directions, identification as to whether or not the driven section is provided, is also required, and the lenses having the driven section are arranged such that, the identification of the relations of the driving directions and the change-over of the motor driving direction between the forward and reverse rotations is effected. In the above case, the signal indicative of the presence or absence of the driven section may be utilized in addition to the mechanical and/or electrical two stage signal representing the driving directions to form a three stage signal so that automatic reversing of the motor driving directions is effected in response to the three stage signal only with respect to the interchangeable lenses having the driven sections.

For obtaining the three stage signal as described above, in the embodiment of FIGS. 1 and 2 for example, another signal pin having a height different from the signal pin 37 may be provided in the interchangeable lens without the driven section to be detected by Gray cord at the side of the camera body, or to open a normally closed switch provided in the camera body in series with the main switch.

In the embodiment of FIG. 3 through FIG. 5, the mounting portion in the interchangeable lens without the driven section may be arranged not to have any connecting terminals and such mounting portion should preferably be made into an insulated surface. In the embodiment of FIGS. 6 through 9, it may be so arranged that a high resistance conductive portion which gives a proper resistance between the body side terminals 52a and 52b is provided in the mounting portion of the interchangeable lens without the driven section, and the automatic focusing is kept suspended upon detection of the particular resistance value in the circuit construction at the camera body. Furthermore, in addition to the above suspension of automatic focusing, it is possible to provide a warning that the main switch for the automatic focusing device is to be cut off, for example, in a view finder, etc., so that it is readily noticed by the user of the camera.

In the embodiment of FIGS. 10 through 12, the arrangement for obtaining the three stage signal as described above may be so made that the recess or concave portion deeper in length than the length $L_1$ in FIG. 10 is provided in the mounting portion of the interchangeable lens without the driven shaft so that the driving shaft can project to a far greater extent due to the absence of the driven section, and a normally closed switch which may be opened only with the driving shaft projecting to such an extent that it is provided in series with the main switch.

The case where a read only memory (referred to ROM hereinbelow) is employed as one of the signal means is also included within the scope of the present invention. More specifically, as shown in FIG. 18 the ROM and the input and output means therefor are provided in the interchangeable lens, and information of the relation between the driving directions of the driven section and the focus adjusting section of the interchangeable lens and/or information with respect to the presence or absence of the driven section are preliminarily memorized in the ROM in digital form. Similarly, it may be so arranged that an information processing device at the side of the camera body effects the automatic forward and reverse rotation change-over of the motor driving direction in accordance with the relation of the driving directions of the respective interchangeable lenses via the connecting terminals on the mounting surface, through utilization of the memorized information described earlier, and/or keeps the automatic focusing function suspended in the lenses without driven shafts.

A main body of an optical instrument to which the present invention may be applied is not limited to the still camera as described so far, but there may be various other optical instruments, for example, movie cameras such as an 8 mm motion picture camera, video camera or the like, various kinds of projectors, enlargers, etc. and other optical instruments requiring focus adjustments.

In the foregoing embodiments, although only the relations between the camera body and the interchangeable lenses have been described, the present invention is of course effective between the extension rings, bellows, focusing units, rear converters, etc. which are inserted between the camera body and the interchangeable lenses, or between these appliances and the interchangeable lenses.

It should be noted here that the present invention may be applied to any focusing driving force transmission between interchangeable optical instruments and appliances which are attached or detached with respect to each other, and in the present specification, the side provided with the driving section is referred to as the main body of the optical instrument, while the side having the driven section and focus adjusting means is described as the interchangeable optical unit.

Furthermore, in the embodiments described so far, there are shown the arrangements in which, upon attaching of the interchangeable lens on the camera body, the driving direction of the driving section may be automatically reversed by the signal indicating that the relation between the driving directions of the driven section and focus adjusting means in the interchangeable lens which is opposite, but as shown in FIG. 13 through FIG. 16, it is also possible to arrange in such a manner that, with respect to the interchangeable lens 101 whose relation of the driving directions is normal, and the interchangeable lens 102 whose relation of the driving directions is opposite, indications 103 and 104 are provided as visual signals in accordance with the relations of the driving directions thereof, at a portion of the external surface, for example, at a part of the front end face or outer periphery of the rear end portion, etc. which may be readily confirmed by a user, and further that a driving direction forward and reverse changeover switch 106 manually operated is provided at a portion of the camera body 105 according to such indications 103 and 104. In this case, the construction is most simplified.

Figure 15:
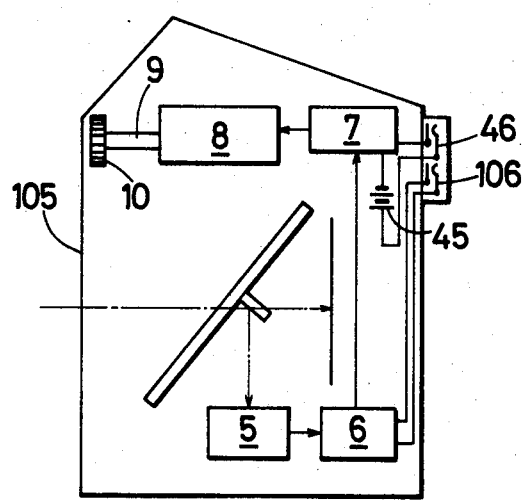
FIG. 15 is a side sectional view of a camera body.
Figure 16:
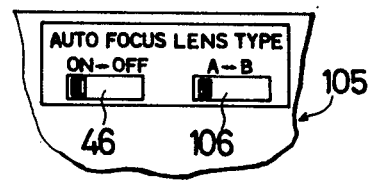
FIG. 16 is a fragmentary rear side view showing an essential portion of the camera body.

If the switch 106 is disposed in the vicinity of the main switch 46 as shown in FIGS. 15 and 16, attention may be readily directed to the necessity of operating the switch 106 during the operation of the main switch 46 for effecting the automatic focusing, and thus, failure due to accidental non-actuation of the switch may be advantageously prevented.

Figure 17:
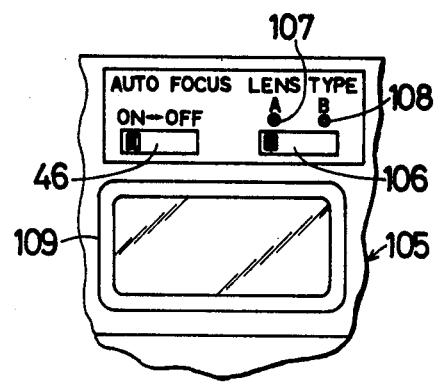
FIG. 17 is a view similar to FIG. 16 but particularly shows a modification thereof.

It is more convenient, if signals indicative of relations between the driving directions of the driven section and the focus adjusting means in the interchangeable lenses 101 and 102 are applied to the camera body 105 and such that indicator lamps 107 and 108 indicate through illumination, the direction in which the switch 106 is changed over in accordance with the signals as shown in FIG. 17. In this case, when the indicator lamps 107 and 108 and the switch 106 are provided in the vicinity of a finder eye piece 109 which is frequently observed by the user, it is ensured at all times whether or not the switch 106 has been changed over to a proper side.

What is claimed is:

1. An automatic focusing arrangement for an optical instrument having a main body and an interchangeable optical unit capable of being removably mounted on said main body, wherein said main body includes a focusing signal generating means for generating a focusing signal representing a focusing direction, and a focusing driving section operating in response to said focusing signal in a forward or reverse direction depending on the focusing direction represented by said focusing signal, and wherein said interchangeable optical unit includes a driven section driven by said focusing driving section with said optical unit mounted on said main body and a focus adjusting section driven by said driven section to move for focus adjustment, a relation signal representing the relationship between the driving directions of said driven section and said focus adjusting section being normal or reversed in accordance with the type of said interchangeable optical unit, said arrangement comprising:

a signal means provided in said optical unit for generating said relation signal; and operation direction changing means provided in said main body for changing the operating direction of said focusing driving section represented by said focusing signal in response to said relation signal when said relation signal represents that the relationship between the driving directions of said driven section and said focus adjusting section is opposite, whereby said focus adjusting section moves in a proper direction for focus adjustment in accordance with said focusing signal regardless of the type of said interchangeable optical unit.

2. An automatic focusing arrangement as claimed in claim 1, wherein said signal means includes a mechanical signal member the dimension and/or position are dependent on the relation between the driving directions of said driven section and said focus adjusting section to form said relation signal.

3. An automatic focusing arrangement as claimed in claim 1, wherein said signal means includes an electrical signal member for generating said relation signal in the form of an electrical signal.

4. An automatic focusing arrangement as claimed in claim 2 or 3, wherein said operating direction changing means is arranged to automatically effect the changing of the operation direction of said focusing driving section in response to said relation signal.

5. An automatic-focusing arrangement as defined in claim 3, wherein said electrical signal member is a ROM for storing said relation signal.

6. An interchangeable optical unit to be detachably mounted on a main body of an optical instrument which includes a focusing signal generating means for generating a focusing signal representative of a focusing direction, and a focusing driving section operating in response to said focusing signal in a forward or reverse direction in accordance with the focusing direction represented by said focusing signal, said optical unit comprising:

an optical system;

a focus adjusting section driven for adjusting said optical system for focus adjustment;

a driven section engageable with said focusing driving section with said optical unit mounted on said main body so as to be driven by said focusing driving section for driving said focus adjusting section, the relation between the driving directions of said driven section and said focus adjusting section being normal or reversed in accordance with the type of said optical unit; and a signal means for generating a relation signal representing said relation between the driving directions of said driven section and said focus adjusting section.

7. An interchangeable optical unit to be detachably mounted on a main body of an optical instrument, said interchangeable optical unit comprising:

an optical system;

a focus adjusting means driven for adjusting said focusing optical system for focus adjustment;

a driven means arranged to be driven from the exterior of said interchangeable optical unit for driving said focus adjusting means, the relation between the driving directions of said focus adjusting means and said driven means being normal or reversed in accordance with the type of said interchangeable optical unit; and a signal means for generating a relation signal representing said relation between the driving directions of said focus adjusting means and said driven means.

8. An interchangeable optical unit as claimed in claim 7, wherein said signal means includes a mechanical signal member the dimension and/or position of which are dependent on said relation between the driving directions of said focus adjusting means and said driven means to form said relation signal.

9. An interchangeable optical unit as defined in claim 7, wherein said signal means includes an electrical signal member for generating said relation signal in the form of an electrical signal.

10. An interchangeable optical unit as defined in claim 9, wherein said electrical signal member is a ROM for storing said relation signal.

11. A main body of an optical instrument for automatic focus adjustment, comprising:

a focusing signal generating means for generating a focusing signal representative of a focusing direction;

a focusing driving means operating in response to said focusing signal in a forward or reverse direction in accordance with the focusing direction represented by said focusing signal; and an operating direction changing means adapted to receive distinguishable first and second signals from the exterior of said main body for changing the operational direction of said focusing driving means from that given by said focusing signal only upon receipt of said first signal.

12. A main body of an optical instrument as claimed in claim 11, wherein the changing means is arranged to be actuated through manual operation.

13. A main body of an optical instrument as defined in claim 11, wherein said operating direction changing means is arranged to automatically effect the changing of the operation direction of said focusing driving means in response to said first signal.

14. An interchangeable optical unit to be removably attached to a main body of an optical instrument provided with a focusing driving section, comprising:

an optical system; a focus adjusting means for moving said focusing optical system; a driven section engaged with said focusing driving section upon attachment of said interchangeable optical unit onto said optical instrument main body so as to be driven by said focusing driving section for driving said focus adjusting means; and indication means for indicating the relationship between driving directions of said driven section and said focus adjusting means.

15. An interchangeable optical unit as claimed in claim 14, wherein said indication means is arranged to be visual indication disposed at an outer portion of said optical unit.

16. An interchangeable optical unit to be detachably mounted on a main body of an optical instrument, comprising:

an optical system;

a focus adjusting means driven for adjusting said opticl system for focus adjustment;

a driven means arranged to be driven from the exterior of said interchangeable optical unit for driving said focus adjusting means, the relation between the driving directions of said focus adjusting means and said driven means being normal or reversed in accordance with the type of said interchangeable optical unit; and an indication means for indicating said relation between the driving directions of said focus adjusting means and said driven means.

* * * * *